United States Patent
Stilleke et al.

(10) Patent No.: US 7,946,652 B2
(45) Date of Patent: May 24, 2011

(54) FITTING FOR A VEHICLE SEAT

(75) Inventors: Martin Stilleke, Troy, MI (US); Dirk Brassat, Clarkston, MI (US); Bill Thaens, Waterford, MI (US); Tony Ferenc, Goodrich, MI (US)

(73) Assignee: KEIPER GmbH & Co. KG, Kaiseralautern (DE)

( * ) Notice: Subject to any disclaimer, the term of this patent is extended or adjusted under 35 U.S.C. 154(b) by 310 days.

(21) Appl. No.: 11/986,264

(22) Filed: Nov. 20, 2007

(65) Prior Publication Data
US 2009/0127910 A1  May 21, 2009

(51) Int. Cl.
*B60N 2/235* (2006.01)
(52) U.S. Cl. .................... 297/367 R; 297/362
(58) Field of Classification Search ............. 297/367 R, 297/362
See application file for complete search history.

(56) References Cited

U.S. PATENT DOCUMENTS

| 5,634,689 | A | 6/1997 | Putsch et al. |
| 6,454,354 | B1 | 9/2002 | Vossmann et al. |
| 6,619,743 | B1 | 9/2003 | Scholz et al. |
| 6,918,635 | B2 * | 7/2005 | Finner et al. .................. 297/362 |
| 6,991,295 | B2 | 1/2006 | Peters |
| 7,188,903 | B2 | 3/2007 | Finner et al. |
| 7,264,566 | B2 | 9/2007 | Dill et al. |
| 7,314,250 | B1 * | 1/2008 | Eblenkamp et al. .......... 297/362 |
| 7,461,900 | B2 * | 12/2008 | Lange ....................... 297/367 R |
| 7,648,203 | B2 * | 1/2010 | Voss et al. ................. 297/362 X |

* cited by examiner

*Primary Examiner* — Anthony D Barfield
(74) *Attorney, Agent, or Firm* — Womble Carlyle Sandridge & Rice, PLLC

(57) ABSTRACT

In the case of a fitting (10) for a vehicle seat, in particular for a motor vehicle seat, having a first fitting part (11), a second fitting part (12) in geared connection with the first fitting part (11), and a rotatably mounted eccentric (27) driven by a driver (21) to cause relative rolling between the first fitting part (11) and the second fitting part (12), a securing-ring (43) is clipped on a hub (22) of the driver (21) and surrounds a bead (22*b*) of the hub (22), wherein the bead (22*b*) has a non-constant radius.

24 Claims, 7 Drawing Sheets

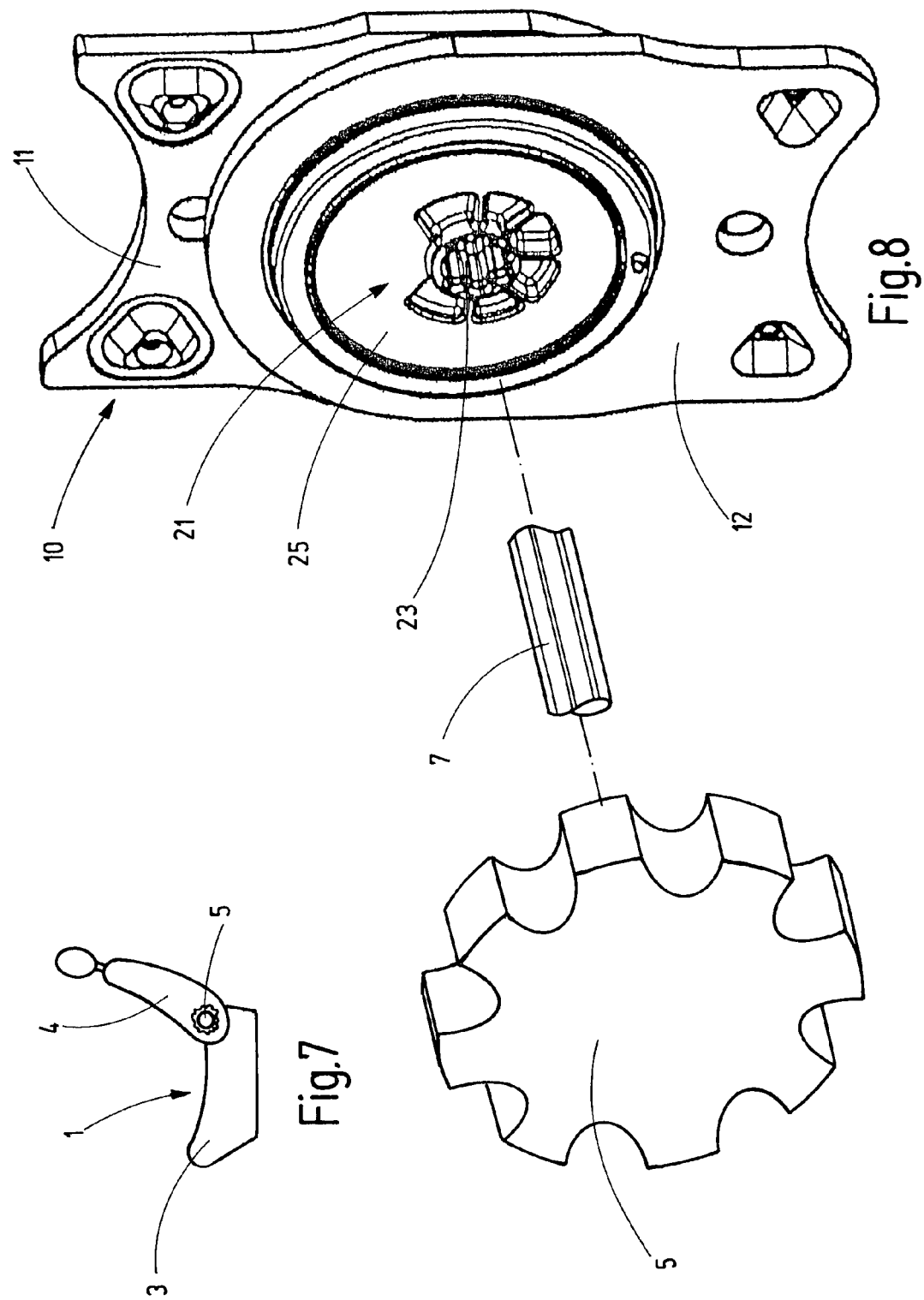

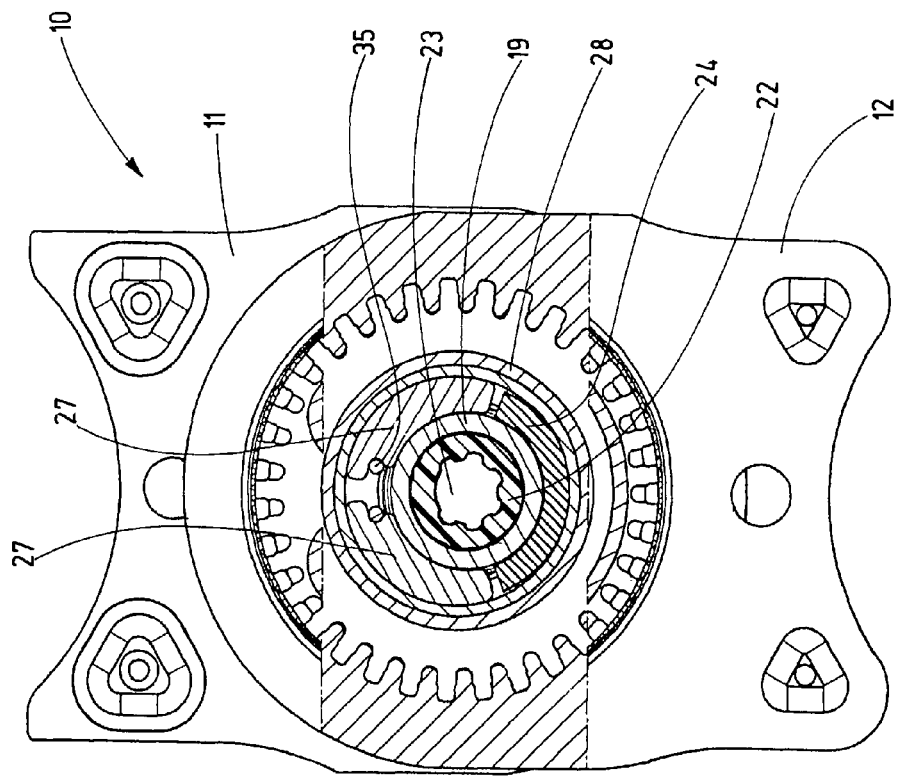
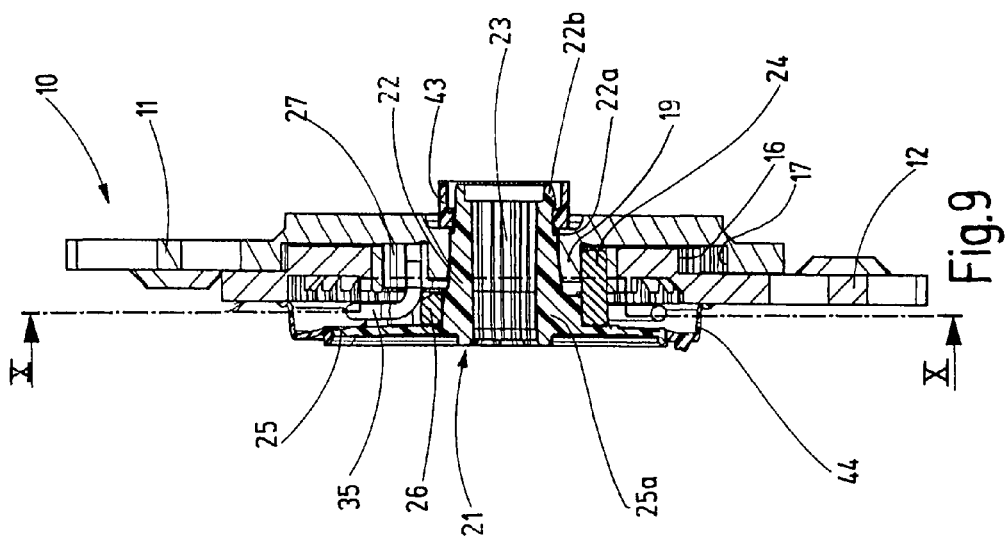
Fig.10
Fig.9

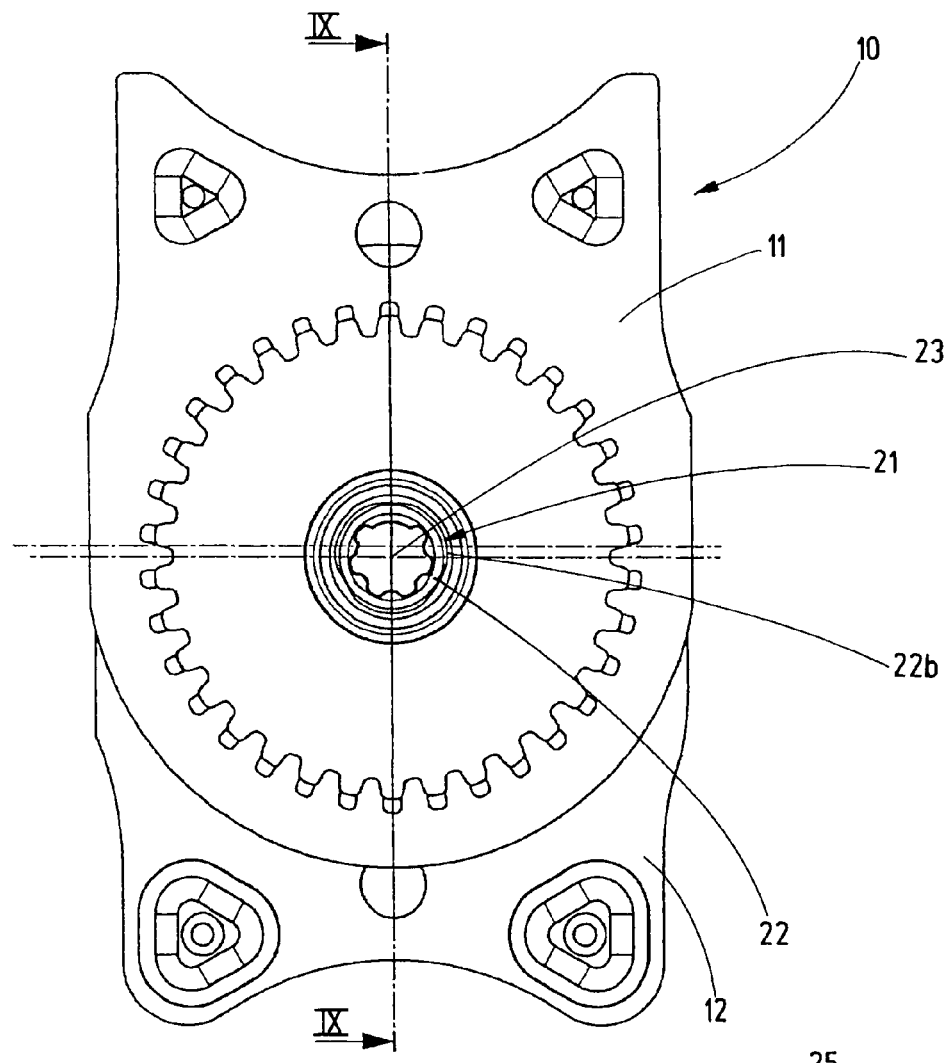
Fig.11
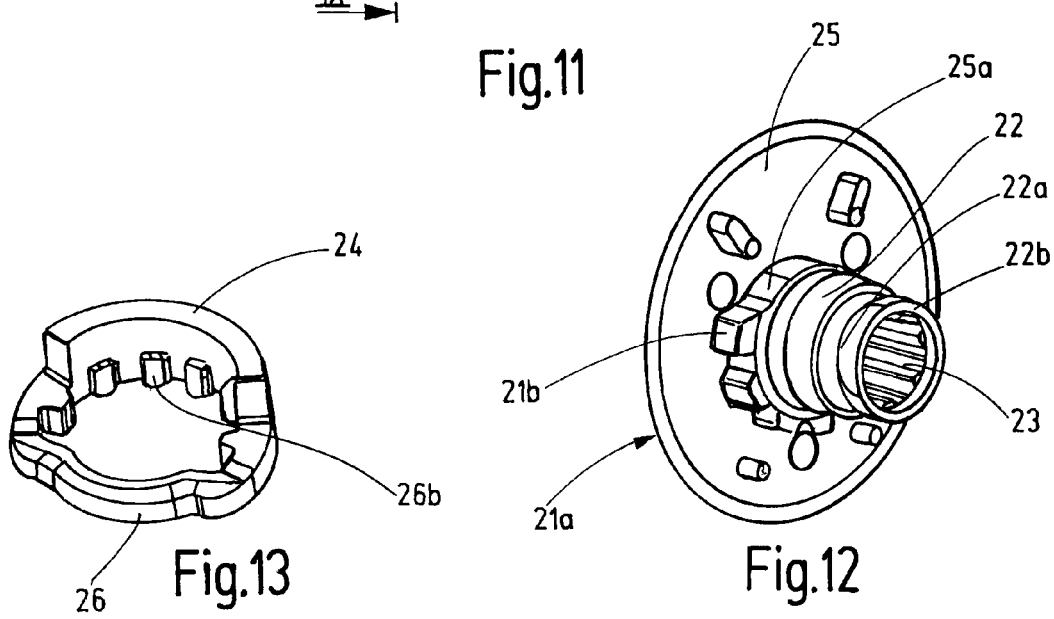
Fig.13
Fig.12

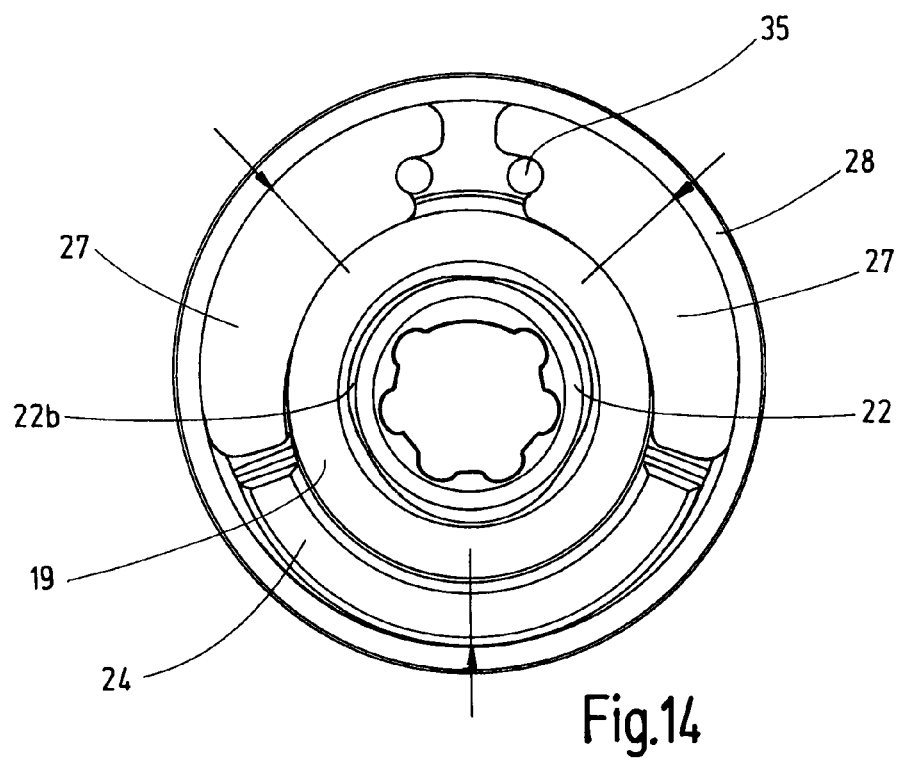
Fig.14
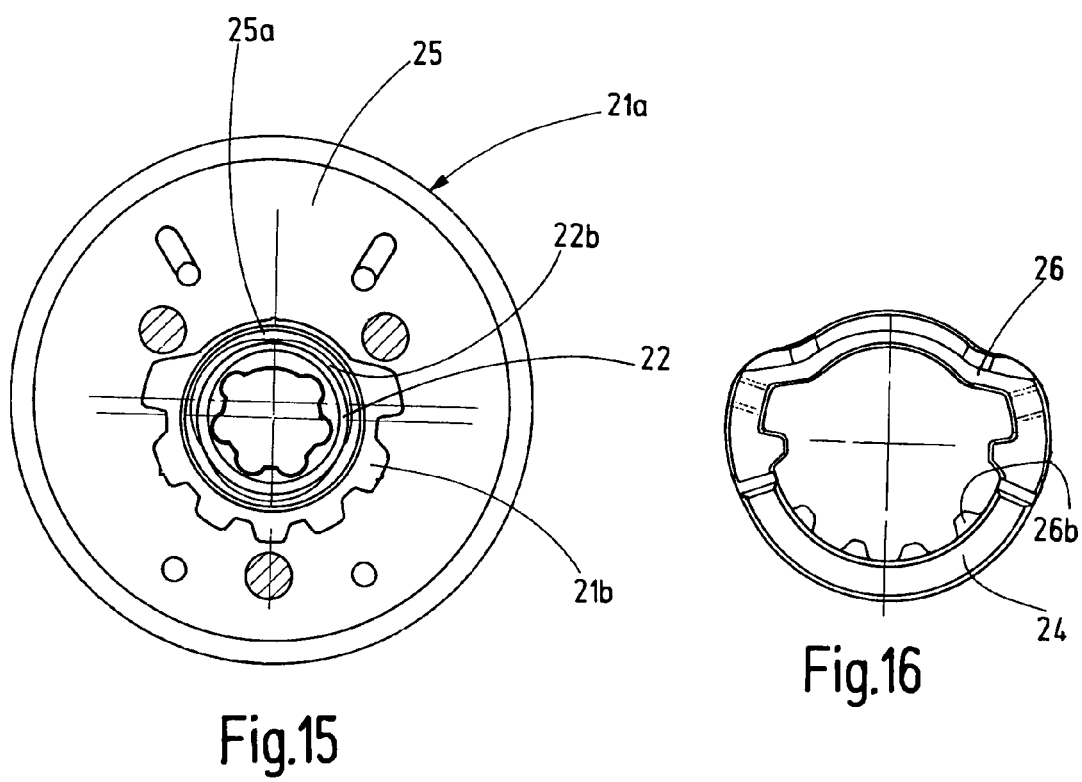
Fig.15
Fig.16

US 7,946,652 B2

FITTING FOR A VEHICLE SEAT

BACKGROUND OF THE INVENTION

An aspect of the present invention relates to a fitting for a vehicle seat, in particular for a motor vehicle seat, with the fitting comprising a first fitting part and a second fitting part, wherein there is geared connection between the first fitting part and the second fitting part so that there can be relative rolling between the first fitting part and the second fitting part; a rotatably mounted eccentric for being driven, and for causing the relative rolling between the first fitting part and the second fitting part in response to the eccentric being driven; a driver for driving the eccentric so that the eccentric causes the relative rolling between the first fitting part and the second fitting part, wherein the driver comprises a hub for bearing the driver in the first fitting part, and the hub ends with a bead; and a securing-ring for axially securing the driver, wherein the securing ring is clipped on the hub and surrounds the bead.

A fitting of the type described above is disclosed in at least one of U.S. Pat. No. 5,634,689, U.S. Pat. No. 6,619,743, and U.S. Pat. No. 7,188,903.

BRIEF SUMMARY OF SOME ASPECTS OF THE INVENTION

An aspect of the present invention is the provision of improvements to a fitting of the type described above, for example to simplify the assembling of the fitting and/or to increase the resistance with respect to a load.

In accordance with one aspect of the present invention, a fitting for a vehicle seat, in particular for a motor vehicle seat, comprises a first fitting part and a second fitting part, wherein there is geared connection between the first fitting part and the second fitting part so that there can be relative rolling between the first fitting part and the second fitting part; a rotatably mounted eccentric for being driven, and for causing the relative rolling between the first fitting part and the second fitting part in response to the eccentric being driven; a driver for driving the eccentric so that the eccentric causes the relative rolling between the first fitting part and the second fitting part, wherein the driver comprises a hub for bearing the driver in the first fitting part, and the hub ends with a bead; and a securing ring for axially securing the driver, wherein the securing ring is clipped on the hub and surrounds the bead, and the bead has a non-constant radius. Thus, the tension within the securing ring during the clipping-on process and the press out force are reduced by this geometry change from a round to a preferably (e.g., optionally) triangular geometry (e.g., a substantially tri-oval shape of the bead). In accordance with one aspect of the present invention, the securing ring is bent and stretched a little bit while the securing ring is being clipping onto the hub, which is in contrast to the prior art, in which the securing ring would only be highly stretched and might break.

In accordance with some of the exemplary embodiments of the present invention, the geared connection between the first fitting part and the second fitting part may be provided as described, for example, in U.S. Pat. No. 5,634,689, U.S. Pat. No. 6,619,743, or U.S. Pat. No. 7,188,903, or it may be provided as described, for example, in U.S. Pat. No. 7,264,566. The entire disclosure of each of U.S. Pat. Nos. 5,634,689, 6,619,743, 7,188,903 and 7,264,566 is incorporated herein by reference.

Aspects of the present invention (e.g., that relate to the bead having a non-constant radius) are not exclusive for fittings with a geared connection between the first fitting part and the second fitting part, i.e. geared fittings. Aspects of the present invention (e.g., that relate to the bead having a non-constant radius such as, but not limited to, a non-constant radius that defines a substantially tri-oval shape) can also be used for detent fittings, as described, for example, in U.S. Pat. No. 6,454,354 or U.S. Pat. No. 6,991,295. The entire disclosure of each of U.S. Pat. No. 6,454,354 and U.S. Pat. No. 6,991,295 is incorporated herein by reference. In these cases (e.g., detent-fitting embodiments of the present invention), the eccentric does not drive a rolling movement of two fittings part having a geared connection therebetween; rather, a rotatably mounted, spring-loaded eccentric presses on toothed segments so as to push the toothed segments radially outward for locking the fitting. Thus, the eccentric controls the relative movement of the fitting parts. The driver is typically connected to the eccentric. Driving the driver turns the eccentric back and unlocks the fitting, e.g., by way of a disk rotating along with the eccentric and pulling the toothed segments radially inward.

In accordance with another aspect of the present invention, a fitting for a vehicle seat, in particular for a motor vehicle seat, comprises a first fitting part and a second fitting part, wherein there is geared connection between the first fitting part and the second fitting part so that there can be relative rolling between the first fitting part and the second fitting part, with the first fitting part comprising a collar element; a rotatably mounted eccentric for being driven, and for causing the relative rolling between the first fitting part and the second fitting part in response to the eccentric being driven, with the eccentric comprising two wedge segments that are urged away from one another, and the two wedge segments being mounted on the collar element and being mounted in the second fitting part; and a driver for driving the eccentric so that the eccentric causes the relative rolling between the first fitting part and the second fitting part. The fitting is operative for steplessly adjusting inclination of the backrest of the vehicle seat by way of the relative rolling between the first fitting part and the second fitting part, which occurs in response to the eccentric being driven. The driver comprises a driving bushing and a driving ring, which are separate pieces. The driving bushing is used for driving the driving ring, and the driving ring is used for driving the eccentric by way of a driving segment. The driving ring is mounted on the collar element. The driving segment is designed to come into contact with the second fitting part in case of (e.g., in response to) a load. Thus, the fitting has a higher resistance with respect to load. A tilting of the driver is avoided. The flow of forces can also pass along the line: first fitting part with collar element, driving ring with driving segment, second fitting part (or vice versa).

The use of an eccentric planetary gear permits the angle of inclination of a backrest of the vehicle seat backrest to be steplessly adjusted. The eccentric planetary gear can be driven manually or by way of a motor.

Other aspects and advantages of the present invention will become apparent from the following.

BRIEF DESCRIPTION OF THE DRAWINGS

The invention is described in more detail below with reference to three exemplary embodiments illustrated in the drawings, which are briefly described in the following.

FIG. 7 shows a diagrammatic illustration of a vehicle seat.

FIG. 8 shows an exploded illustration, with the exploded illustration of FIG. 8 being common for all exemplary embodiments.

FIG. 9 shows a section through the second exemplary embodiment, with the section taken along the line IX-IX in FIG. 11.

FIG. 10 shows a section through the second exemplary embodiment, with the section taken along the line X-X in FIG. 9.

FIG. 11 shows a side view of the second exemplary embodiment.

FIG. 12 shows a perspective view of a driving bushing according to the second exemplary embodiment.

FIG. 13 shows a perspective view of a driving ring according to the second exemplary embodiment.

FIG. 14 shows a partial section through the second exemplary embodiment in case of a load.

FIG. 15 shows a side view of a driving bushing according to the second exemplary embodiment.

FIG. 16 shows a side view of a driving ring according to the second exemplary embodiment.

DETAILED DESCRIPTION OF EXEMPLARY EMBODIMENTS

Figure 2:
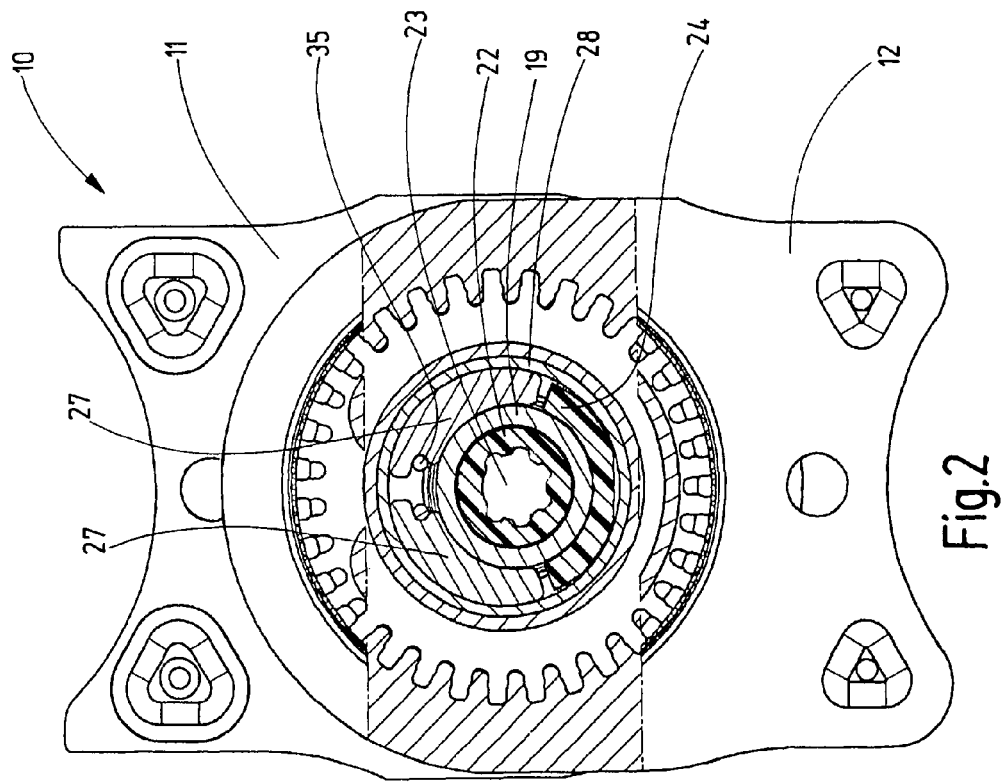
FIG. 2 shows a section through the first exemplary embodiment, with the section taken along the line II-II in FIG. 1.
Figure 1:
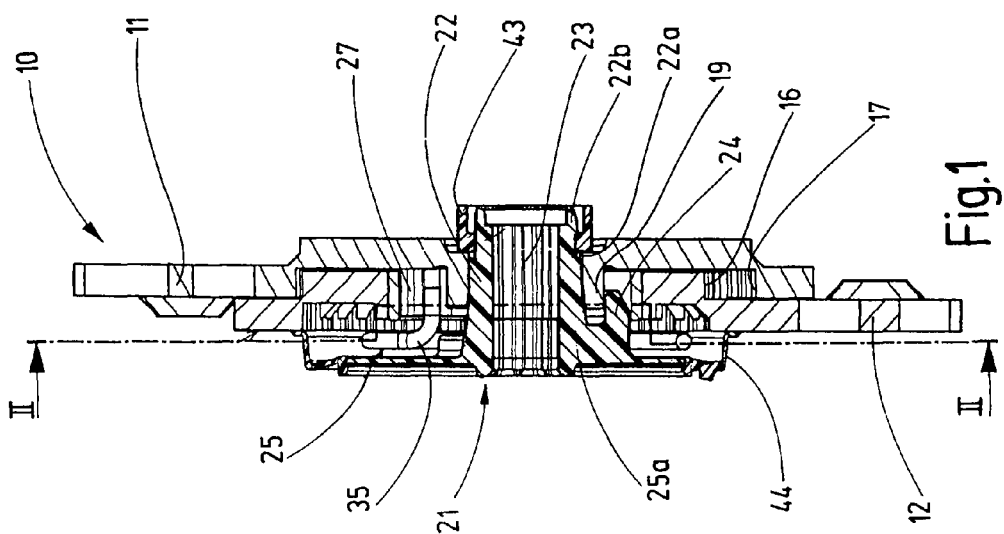
FIG. 1 shows a section through the first exemplary embodiment, with the section taken along the line I-I in FIG. 3.
Figure 3:
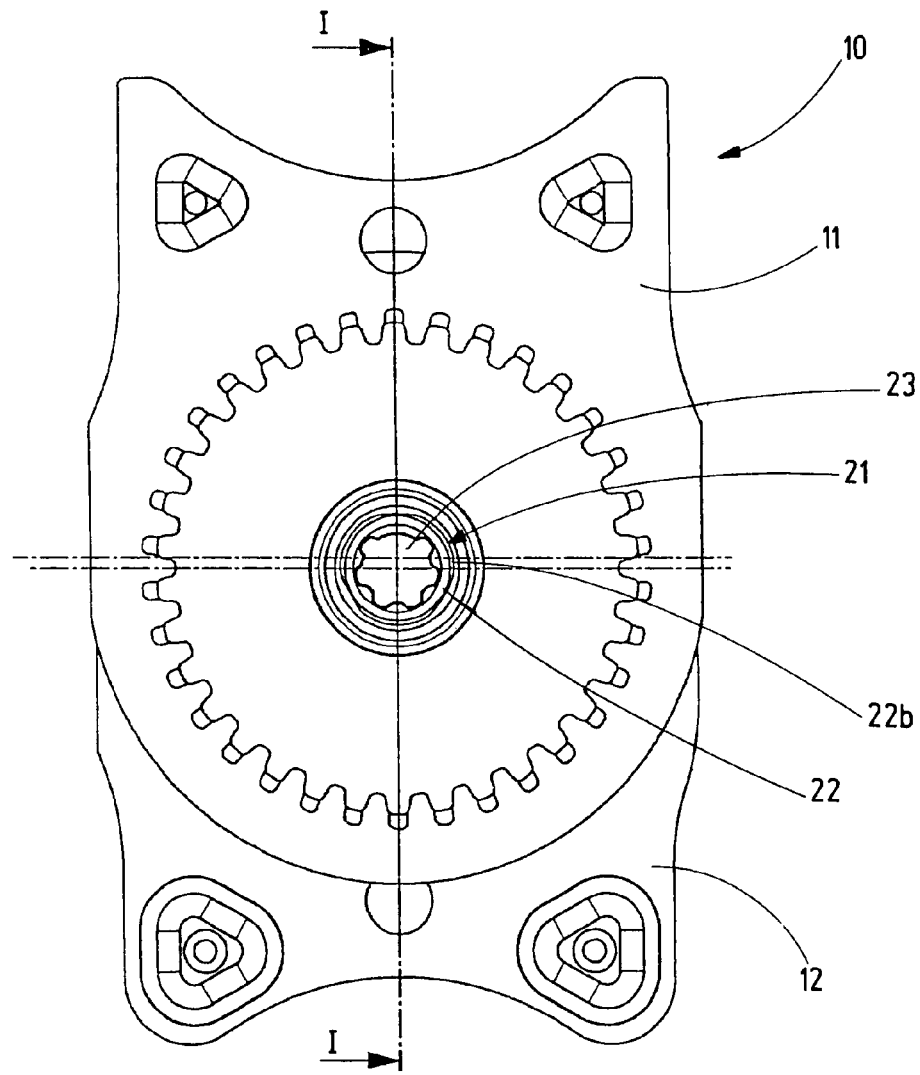
FIG. 3 shows a side view of the first exemplary embodiment.
Figure 4:
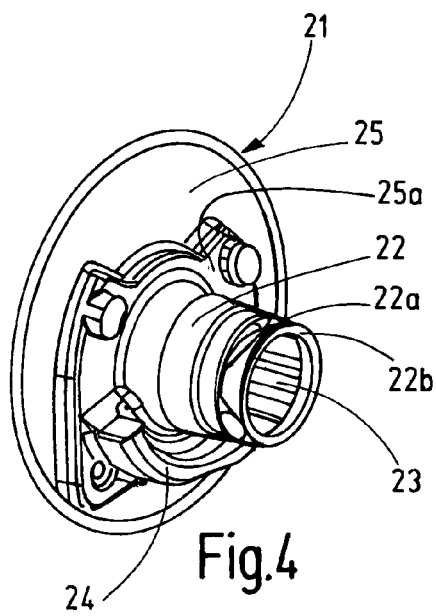
FIG. 4 shows a perspective view of a driver according to the first exemplary embodiment.

Referring now in greater detail to the drawings, in which like numerals refer to like parts throughout the several views, a vehicle seat 1 for a motor vehicle includes a seat part 3 and a backrest 4. The inclination of the backrest 4 can be adjusted relative to the seat part 3 manually or by way of a motor drive. For adjusting the inclination of the backrest 4, a handwheel 5 (or an electric motor) is used to rotate a drive shaft 7 which is arranged horizontally in the transition zone between the seat part 3 and the backrest 4. On both sides of the vehicle seat 1, the drive shaft 7 engages in a fitting 10 in a rotationally fixed manner that will be described further below. The drive shaft 7 defines the directional data of a cylindrical coordinate system that is used in this description.

The fitting 10 is designed as a geared fitting in which a first fitting part 11 and a second fitting part 12 are connected with each other by way of a gear for the purpose of making and securing adjustments. More specifically, the first fitting part 11 and the second fitting part 12 are connected by way of an eccentric planetary gear,—in particular a self-locking planetary gear—as described, for example, in U.S. Pat. No. 5,634,689. The entire disclosure of U.S. Pat. No. 5,634,689 is incorporated herein by reference. In the exemplary embodiments, the more or less plate-shaped (e.g., substantially plate-shaped) first fitting part 11 is fixedly attached (e.g., by way of an adapter) to the structure of the backrest 4, while the more or less plate-shaped (e.g., substantially plate-shaped) second fitting part 12 is fixedly attached (e.g. by way of an adapter) to the seat part 3. In another arrangement the positions of the fittings 11 and 12 can be interchanged. The two fitting parts 11 and 12 may also be disc-shaped.

In order to form the gear mechanism, a toothed wheel 16 with external toothing is embossed on the second fitting 12, a toothed ring 17 with internal toothing is formed on the first fitting 11, and the toothed wheel and the toothed ring intermesh with each other. The radius of the tip circle of the external toothing of the toothed wheel 16 is smaller by at least the height of one tooth than the radius of the root circle of the internal toothing of the toothed ring 17. A corresponding difference of at least one tooth between the number of teeth in the toothed wheel 16 and in the toothed ring 17 permits the toothed ring 17 to roll on the toothed wheel 16, whereby there can be relative rolling (e.g., relative rotation) between the first fitting part 11 and the second fitting part 12. Thus, an eccentric planetary gear is provided.

Concentrically to the internal toothing of the toothed ring 17, the first fitting part 11 has an integrally formed collar element 19 on the side facing the toothed wheel 16. A driver 21 is mounted by way of a hub 22 inside the collar element 19. The hub 22 is arranged in the center of the fitting 10, and is provided with a receptacle (e.g., provided centrally with a borehole 23) for receiving the drive shaft 7. The profile of the borehole 23 matches the profile of the drive shaft 7, which in the exemplary embodiments is the profile of a splined shaft. At a radial distance from its hub 22, the driver 21 includes a driving segment 24 arranged on the (radial) outside of the collar element 19. The driving segment 24 extends around the collar element 19 for less than 180°, more specifically (e.g., actually) about 140°, in the circumferential direction. At one end of the hub 22, the driver 21 is provided with a cover disc 25 having a larger radius than the hub 22. Between the hub 22 and the cover disc 25, the driver 21 is provided with a graduation 25a. The graduation 25a extends radially, with the magnitude of the radial extent of the graduation 25a being between the magnitude of the radius of the hub 22 and the magnitude of the radius of the cover disc 25. The graduation 25a is axially offset from and adjacent to the cover disc 25.

On its (radial) outside, the collar element 19 supports two wedge segments 27 which, by way of their curved outer surfaces, support a sliding bearing bushing 28. The sliding bearing bushing 28 is pressed in a rotationally fixed manner into the second fitting part 12. The two wedge segments 27 together extend for more than 180° in the circumferential direction. The two wedge segments 27 are arranged in a plane axially offset of the graduation 25a. The driving segment 24 engages with play between the narrow ends of the wedge segments 27. The driver 21 may be provided with axial projections touching the two wedge segments 27, to secure the wedge segments 27 in the axial direction.

The broad ends of the wedge segments 27 face each other. Each of the broad ends of the wedge segments 27 accommodate, by way of a recess defined by projecting sections of material, an angled end finger of an annular spring 35. The spring 35 pushes (e.g., urges) the wedge segments 27 apart from one another in the circumferential direction, so that in the event of the wedge segments 27 becoming blocked during operation or if the backrest 4 comes up against a load, the radially outer, projecting sections of material (which are located at the broad ends of the wedge segments 27) may come into contact with and act upon one another.

The driver 21 is secured axially on the outside of the first fitting part 11 by way of a clipped-on securing ring 43. In order to receive the securing ring 43, the hub 22 of the driver 21 is provided with a groove 22a that has a smaller radius than the rest of the hub 22. The hub 22 ends with a bead 22b (e.g., the end of the hub 22 comprises the bead 22b). The bead 22b forms the outer side wall of the groove 22a, and the bead 22b is beveled toward the end face of the hub 22. The securing ring 43 surrounds the bead 22b. The bead 22b does not have a constant radius in the circumferential direction. More specifically, at three locations, the radius of the bead 22b is continuously reduced to the radius of the groove 22a, and continuously enlarged back to the radius of the hub 22. Stated again with some generalizations/further explanations, at three locations, the radius of the bead 22b is continuously (e.g., smoothly) reduced to the radius of (e.g., about to the radius of) the groove(s) 22a (e.g., as a result of which the groove 22a may be characterized as being in the form of three grooves 22a), and continuously (e.g., smoothly) enlarged back to the radius of (e.g., about to the radius of) the hub 22. Thus, the radial section of the bead 22b has a tri-oval shape (e.g., a substantially tri-oval shape). Nonetheless, the undercut provided by the bead 22b and securing the securing ring 43 inside the groove 22a is still maintained for more than 3×90° in the circumferential direction. While clipping-on the securing ring 43, the securing ring 43 is bent and a little bit stretched (i.e., stretched a little bit). In contrast, in the prior art, the securing ring 43 would be only highly stretched while being clipped on.

A sealing ring 44 is provided on the outside of the second fitting part 12, between the embossing for the toothed wheel 16 and the cover disc 25 of the driver 21. The sealing ring 44, which may be made, for example, of rubber, is mounted on the circumference of the cover disc 25.

The wedge segments 27 define an eccentric for at least partially controlling the relative rolling (e.g., relative rotation) between the first fitting part 11 and the second fitting part 12. More specifically, the wedge segments 27 define an eccentric which, by extension in the direction of the eccentricity, presses the toothed wheel 16 into the toothed ring 17 at an engagement point defined by the cooperative design/interaction between the toothed wheel, toothed ring and eccentric. When the drive force is provided by the rotating drive shaft 7, torque is transmitted first to the driver 21 and then by the rotating driver 21 to the eccentric, so that the eccentric slides along the sliding bearing bushing 28, changing the direction of the eccentricity and thus changing the point of engagement of the toothed wheel 16 in the toothed ring 17, which manifests itself as a wobbling rolling movement, i.e. as relative rotation with a superimposed wobbling motion. The inclination of the backrest 4 can thus be steplessly adjusted between several use positions.

The preceding features are common for both first and second exemplary embodiments.

In the first exemplary embodiment, the driver 21 is made of one piece, for example made of plastic. The driver 21 of the first exemplary embodiment comprises the hub 22, graduation 25a, driving segment 24, and cover disc 25. The driving segment 24 projects axially from the graduation 25a.

In the second exemplary embodiment, the driver 21 is made of two pieces. More specifically, the driver 21 of the second exemplary embodiment is made of a driving bushing 21a, which for example may be made of plastic, and a driving segment 24, which for example may be made of metal. The driving bushing 21a comprises hub 22, graduation 25a, and cover disc 25. The driving ring 26 comprises the driving segment 24. The driving ring 26 is mounted on (e.g., arranged on the (radial) outside of) the collar element 19. Over part of its circumference, the graduation 25a according to the second exemplary embodiment has radially outwardly directed external teeth 21b. In the region of the external teeth 21b, the graduation 25a holds the driving ring 26 which, in some regions, has internal teeth 26b which engage completely and in a form-fitting manner in the external teeth 21b. Instead of the teeth, other form-fitting connection profiles having ribs, polygonal connections or the like are also possible. In order to eliminate play in the form-fitting connection between the internal teeth 26b and external teeth 21b, the form-fitting engagement can take place with displacement of material of the graduation 25a during the installation. The driving segment 24 projects from the driving ring 26 in the axial direction.

In the normal case, the driving segment 24 does not contact the sliding bearing bushing 28 of the second fitting part 12, but only the two wedge segments 27. In case of (e.g., in response to) a load, e.g. a heavy passenger, a misuse, or a crash, the driving ring 26 of the second exemplary embodiment may come into contact with the sliding bearing bushing 28. Then, a three-point-support (three-point-bearing) between the second fitting part 12 (on which the sliding bearing bushing 28 is mounted) on one hand and the group, consisting of the two wedge segments 27 (defining the eccentric) and the driving segment 24 of the driving ring 26, on the other hand is created. The three points are indicated by arrows in FIG. 14. The group, consisting of the two wedge segments 27 (defining the eccentric) and the driving segment 24 of the driving ring 26, is supporting the first fitting part 11 by the collar element 19 of the first fitting part 11.

Figure 5:
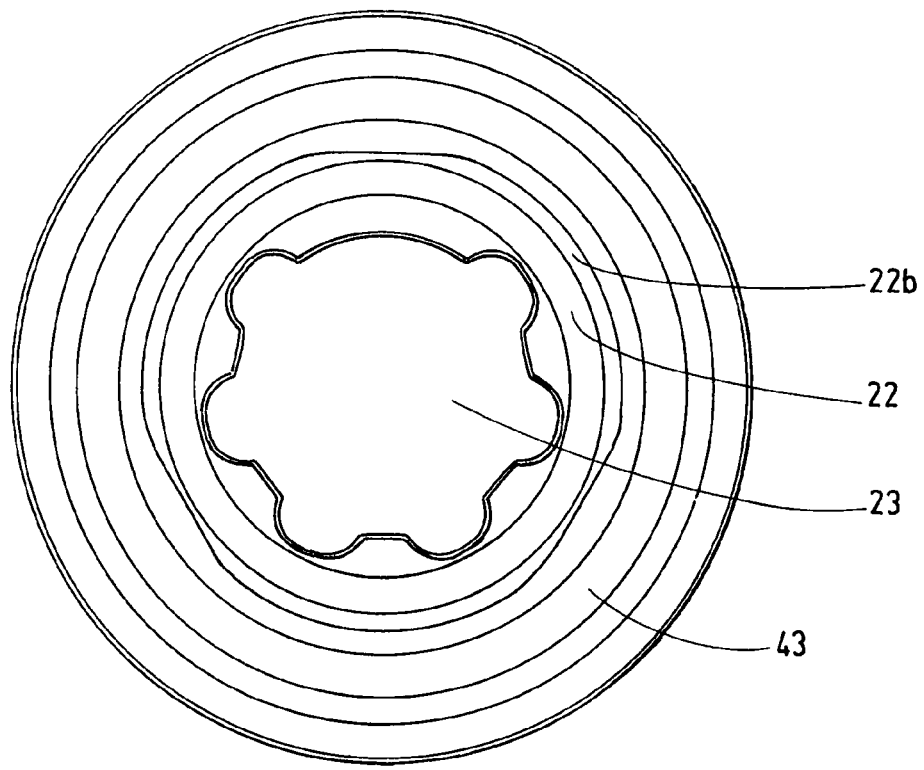
FIG. 5 shows a partial view of FIG. 3 and FIG. 11, with the partial view of FIG. 5 being common for all exemplary embodiments.
Figure 6:
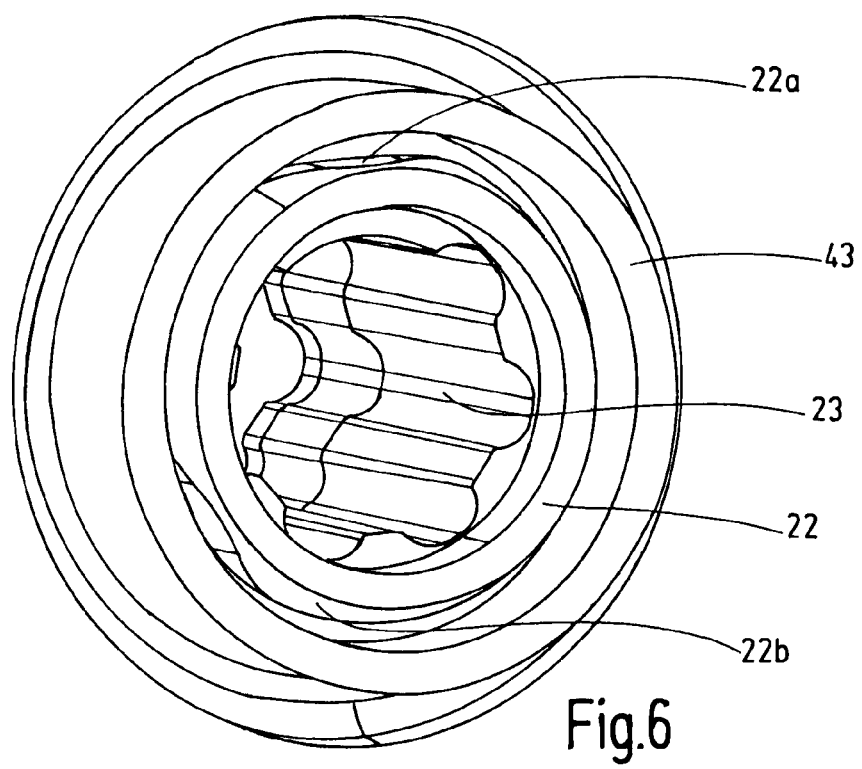
FIG. 6 shows a perspective partial view of FIG. 5, with the perspective partial view of FIG. 6 being common for all exemplary embodiments.

In a third exemplary embodiment, the fitting is a detent fitting, and the driver for unlocking the detent fitting is also provided with a bead, the radial section of which has the above-described tri-oval shape (e.g., a substantially tri-oval shape). That is, FIGS. 5 and 6 show features that also apply to the third exemplary embodiment. Accordingly, the above-described advantages occur for the third exemplary embodiment when the securing ring is clipped onto the hub and surrounds the bead.

It will be understood by those skilled in the art that while the present invention has been discussed above with reference to exemplary embodiments, various additions, modifications and changes can be made thereto without departing from the spirit and scope of the invention as set forth in the following claims.

That which is claimed:

1. A fitting for a vehicle seat, the fitting comprising:
a first fitting part and a second fitting part, wherein there is geared connection between the first fitting part and the second fitting part so that there can be relative rolling between the first fitting part and the second fitting part;
a rotatably mounted eccentric for being driven, and for causing the relative rolling between the first fitting part and the second fitting part in response to the eccentric being driven;
a driver mounted for being rotated about an axis and thereby driving the eccentric so that the eccentric causes the relative rolling between the first fitting part and the second fitting part, wherein the driver comprises a hub for bearing the driver in the first fitting part, and the hub ends with a bead; and
a securing-ring for axially securing the driver, wherein
the securing ring is clipped on the hub and surrounds the bead, and an outer surface of the bead has a non-constant radius in a plane that is perpendicular to the axis.

2. The fitting according to claim 1, wherein the hub includes a groove, and the securing ring is clipped into the groove of the hub.

3. The fitting according to claim 2, wherein the bead forms an outer side wall of the groove.

4. The fitting according to claim 1, wherein the fitting is configured so that there is a superimposed wobbling motion during the relative rolling between the first fitting part and the second fitting part.

5. The fitting according to claim 1, wherein:
the first fitting part comprises a collar element,
the eccentric is mounted on the collar element, and
the driver is mounted in the collar element.

6. The fitting according to claim 1, wherein the eccentric comprises two wedge segments that are urged away from one another.

7. The fitting according to claim 1, wherein the hub includes a receptacle that:
is positioned radially inwardly of the bead,
is for receiving a drive shaft, and
has a profile matching a splined profile of the drive shaft.

8. The fitting according to claim 1, wherein:
the fitting is for a vehicle seat having a backrest;
the first fitting part comprises a collar element;
the eccentric comprises two wedge segments that are urged away from one another, and the two wedge segments are mounted on the collar element and in the second fitting part;
the fitting is operative for steplessly adjusting inclination of the backrest of the vehicle seat by way of the relative rolling between the first fitting part and the second fitting part, which occurs in response to the eccentric being driven;
the driver comprises a driving bushing and a driving ring, the driving bushing includes the hub, the driving bushing and the driving ring are separate pieces with respect to one another, the driving bushing is adapted for driving the driving ring, the driving ring is adapted for driving the eccentric by way of a driving segment, and the driving ring is mounted on the collar element; and
the driving segment is adapted to come into contact with the second fitting part in case of a load.

9. The fitting according to claim 8, wherein:
in case of a load, a three-point-support is created between the second fitting part and a group, and
the group consists of the two wedge segments and the driving segment.

10. The fitting according to claim 8, wherein there is a form-fitting connection between the driving bushing and the driving ring.

11. The fitting according to claim 10, wherein:
the form-fitting connection between the driving bushing and the driving ring is provided at a graduation of the driving bushing,
the wedge segments are arranged in a plane, and
the graduation is axially offset from the plane of the wedge segments.

12. The fitting according to claim 10, wherein the form-fitting connection between the driving bushing and the driving ring comprises a form-fitting connection between:
external teeth of the driving bushing, and
internal teeth of the driving ring.

13. The fitting according to claim 8, wherein the driving bushing is made of plastic, and the driving ring is made of metal.

14. The fitting according to claim 8, wherein the hub includes a receptacle that:
is positioned radially inwardly of the bead,
is for receiving a drive shaft, and
has a profile matching a splined profile of the drive shaft.

15. The fitting according to claim 8, wherein the driving ring includes the driving segment.

16. The fitting according to claim 9, wherein the driving ring includes the driving segment.

17. The fitting according to claim 1, wherein the radius of the outer surface of the bead is reduced and enlarged a plurality of times in a circumferential direction that is confined to said plane and extends around the axis.

18. The fitting according to claim 17, wherein the radius of the outer surface of the bead being reduced and enlarged a plurality of times in the circumferential direction comprises:
the radius of the outer surface of the bead being reduced and enlarged three times in the circumferential direction.

19. A fitting for a vehicle seat, the fitting comprising:
a first fitting part and a second fitting part, wherein there is geared connection between the first fitting part and the second fitting part so that there can be relative rolling between the first fitting part and the second fitting part;
a rotatably mounted eccentric for being driven, and for causing the relative rolling between the first fitting part and the second fitting part in response to the eccentric being driven;
a driver for driving the eccentric so that the eccentric causes the relative rolling between the first fitting part and the second fitting part, wherein
the driver comprises a hub for bearing the driver in the first fitting part,
the hub includes a groove having a radius, and
the hub ends with a bead that has a non-constant radius and forms an outer side wall of the groove, and
at least once in a circumferential direction, the radius of the bead is reduced to the radius of the groove and enlarged back to the radius of the hub; and
a securing-ring for axially securing the driver, wherein the securing ring is clipped on the hub, comprising the securing ring being clipped into the groove of the hub and surrounding the bead.

20. The fitting according to claim 19, wherein the radius of the bead is continuously reduced and enlarged in the circumferential direction.

21. The fitting according to claim 20, wherein the radius of the bead is reduced and enlarged three times in the circumferential direction.

22. A fitting for a vehicle seat, the fitting comprising:
a first fitting part and a second fitting part that are mounted so that there can be relative rotation between the first fitting part and the second fitting part;
a rotatably mounted eccentric for at least partially controlling the relative rotation between the first fitting part and the second fitting part;
a driver mounted for being rotated about an axis and thereby driving the eccentric, with the driver comprising a hub for bearing the driver in the first fitting part, and wherein the hub ends with a bead; and
a securing-ring for axially securing the driver, wherein
the securing ring is clipped on the hub and surrounds the bead, and
an outer surface of the bead has a non-constant radius in a plane that is perpendicular to the axis.

23. The fitting according to claim 22, wherein the radius of the outer surface of the bead is reduced and enlarged a plurality of times in a circumferential direction that is confined to said plane and extends around the axis.

24. The fitting according to claim 23, wherein the radius of the outer surface of the bead being reduced and enlarged a plurality of times in the circumferential direction comprises:
the radius of the outer surface of the bead being reduced and enlarged three times in the circumferential direction.

* * * * *